J. E. COOPER.
ROUNDABOUT OR MERRY-GO-ROUND.
APPLICATION FILED SEPT. 4, 1907.

907,746.

Patented Dec. 29, 1908.
7 SHEETS—SHEET 5.

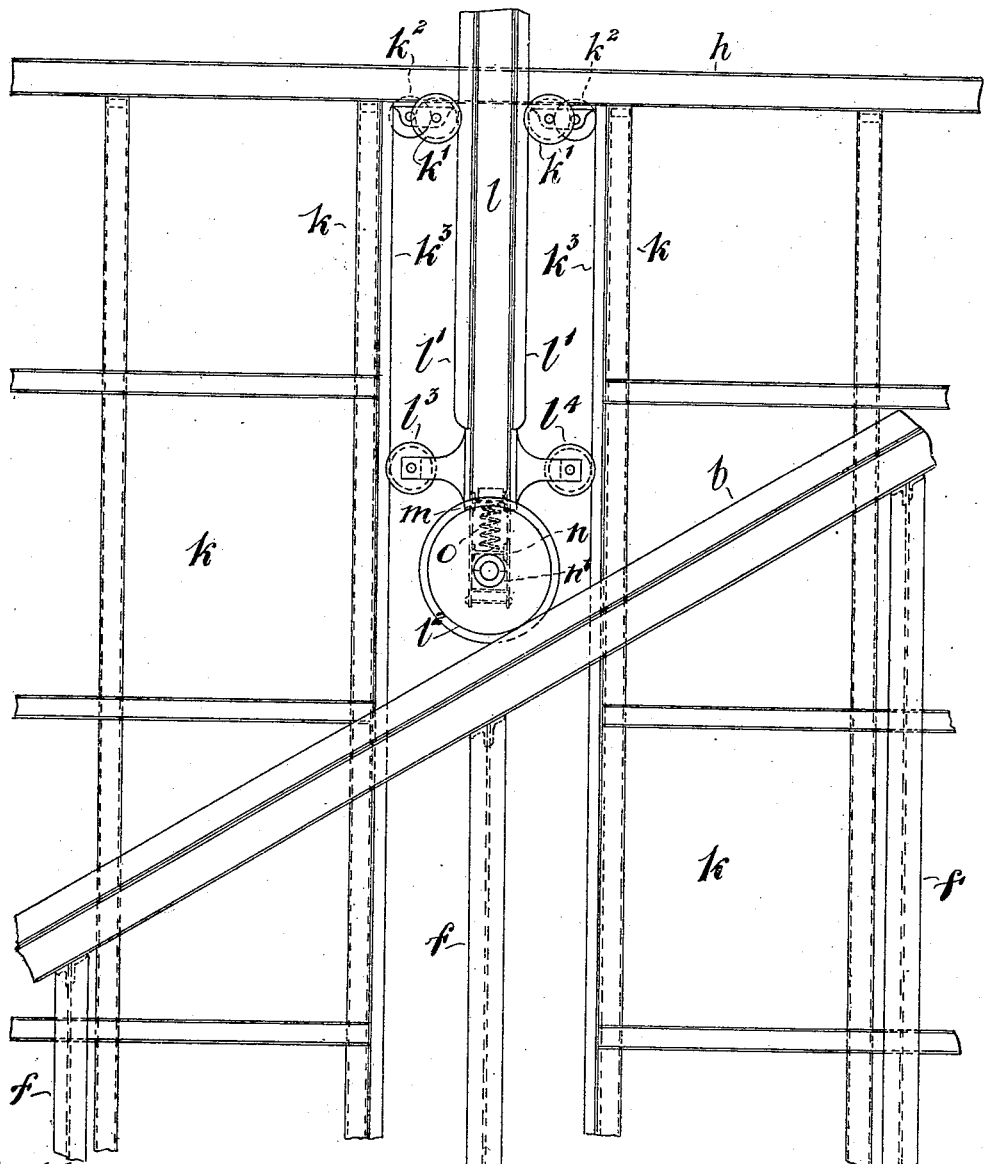

J. E. COOPER.
ROUNDABOUT OR MERRY-GO-ROUND.
APPLICATION FILED SEPT. 4, 1907.
907,746.
Patented Dec. 29, 1908.
7 SHEETS—SHEET 7.
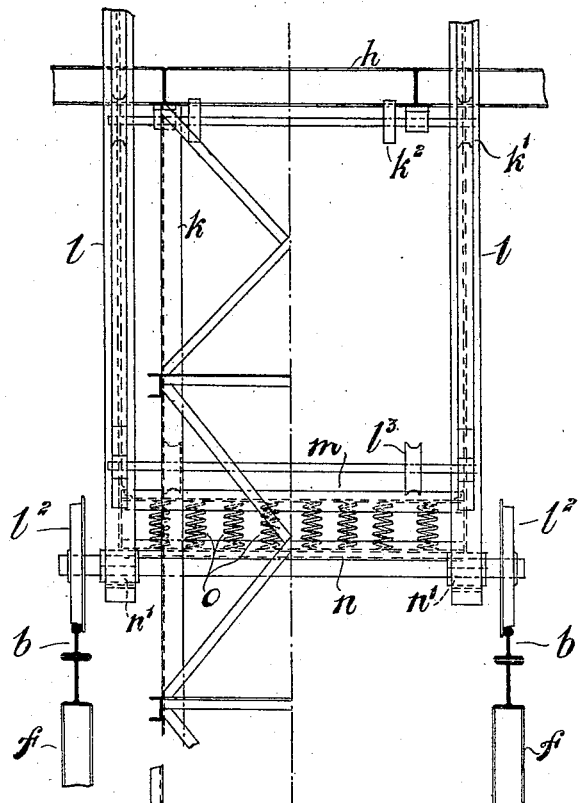
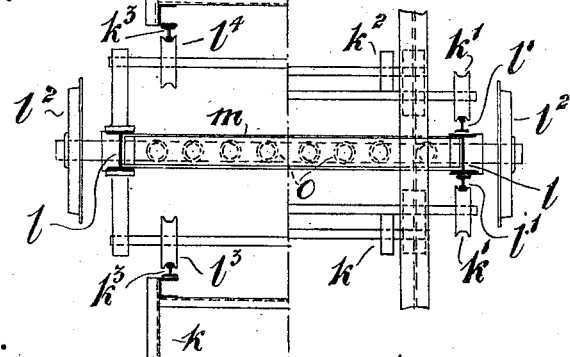

UNITED STATES PATENT OFFICE.

JOHN EDWARD COOPER, OF LONDON, ENGLAND.

ROUNDABOUT OR MERRY-GO-ROUND.

No. 907,746.  Specification of Letters Patent.  Patented Dec. 29, 1908.

Application filed September 4, 1907. Serial No. 391,348.

*To all whom it may concern:*

Be it known that I, JOHN EDWARD COOPER a subject of the King of Great Britain and Ireland, residing at Stratford, London, England, have invented certain new and useful Improvements in Roundabouts or Merry-Go-Rounds; and I do hereby declare the following to be a full, clear, and exact description of the invention, such as will enable others skilled in the art to which it appertains to make and use the same.

This invention comprises certain improvements in roundabouts or merry-go-rounds, in which the circular travel of the cars is accompanied by a vertical or up and down motion, the object being to enable the cars to be carried up and down a considerable distance with comfort and safety.

In order that my invention may be clearly understood and readily carried into effect, I will proceed to describe the same, and for that purpose shall refer to the accompanying drawings, in which—

Figure 1:
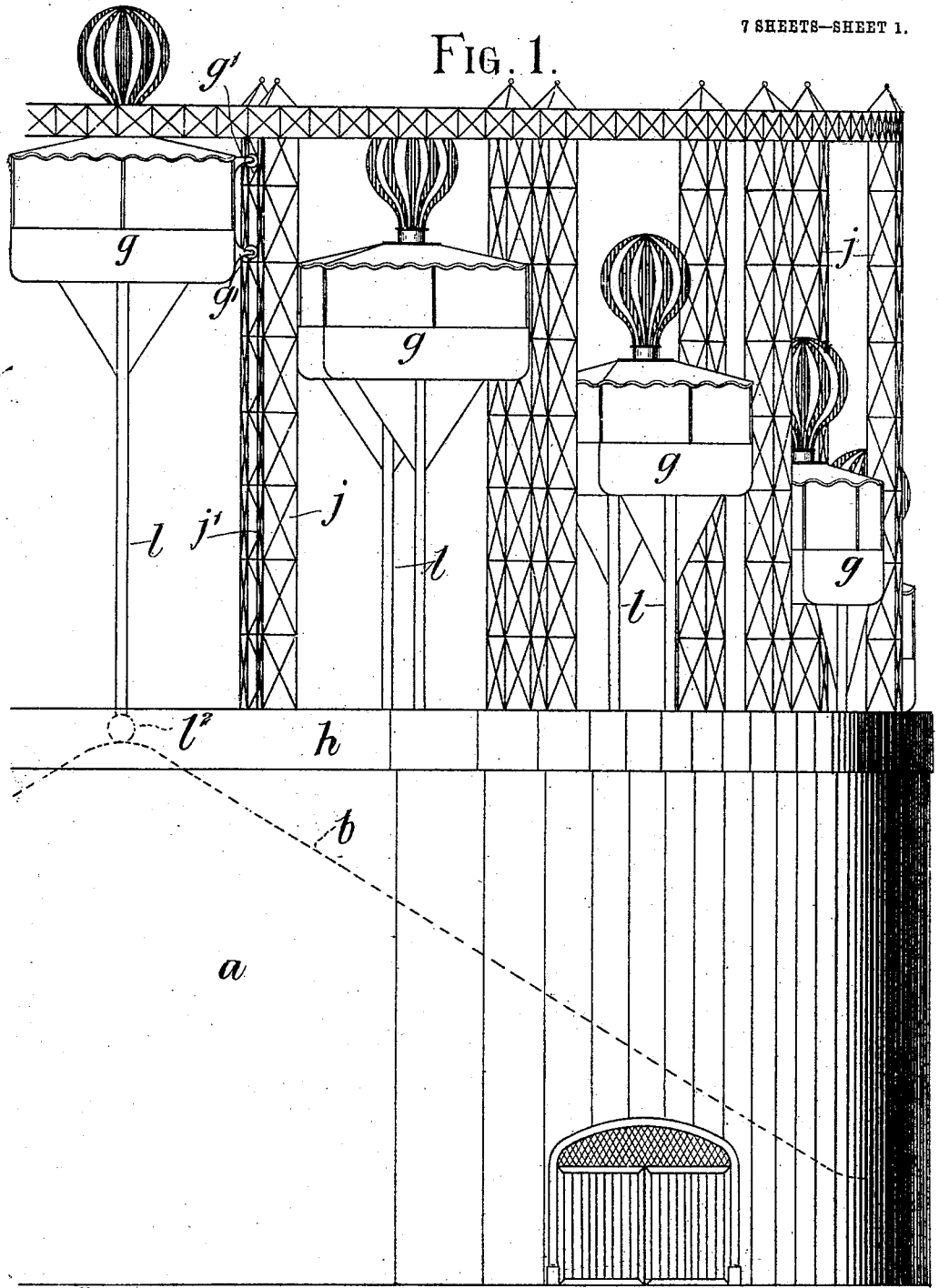
Figure 2:
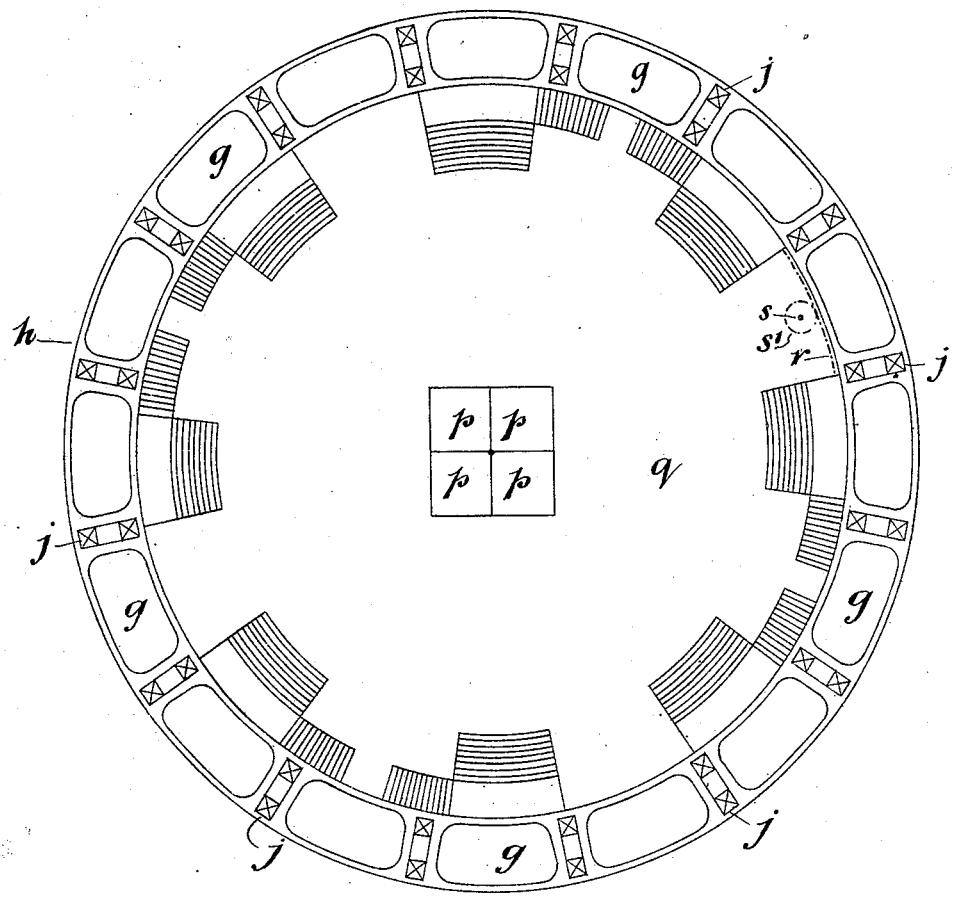
Figure 3:
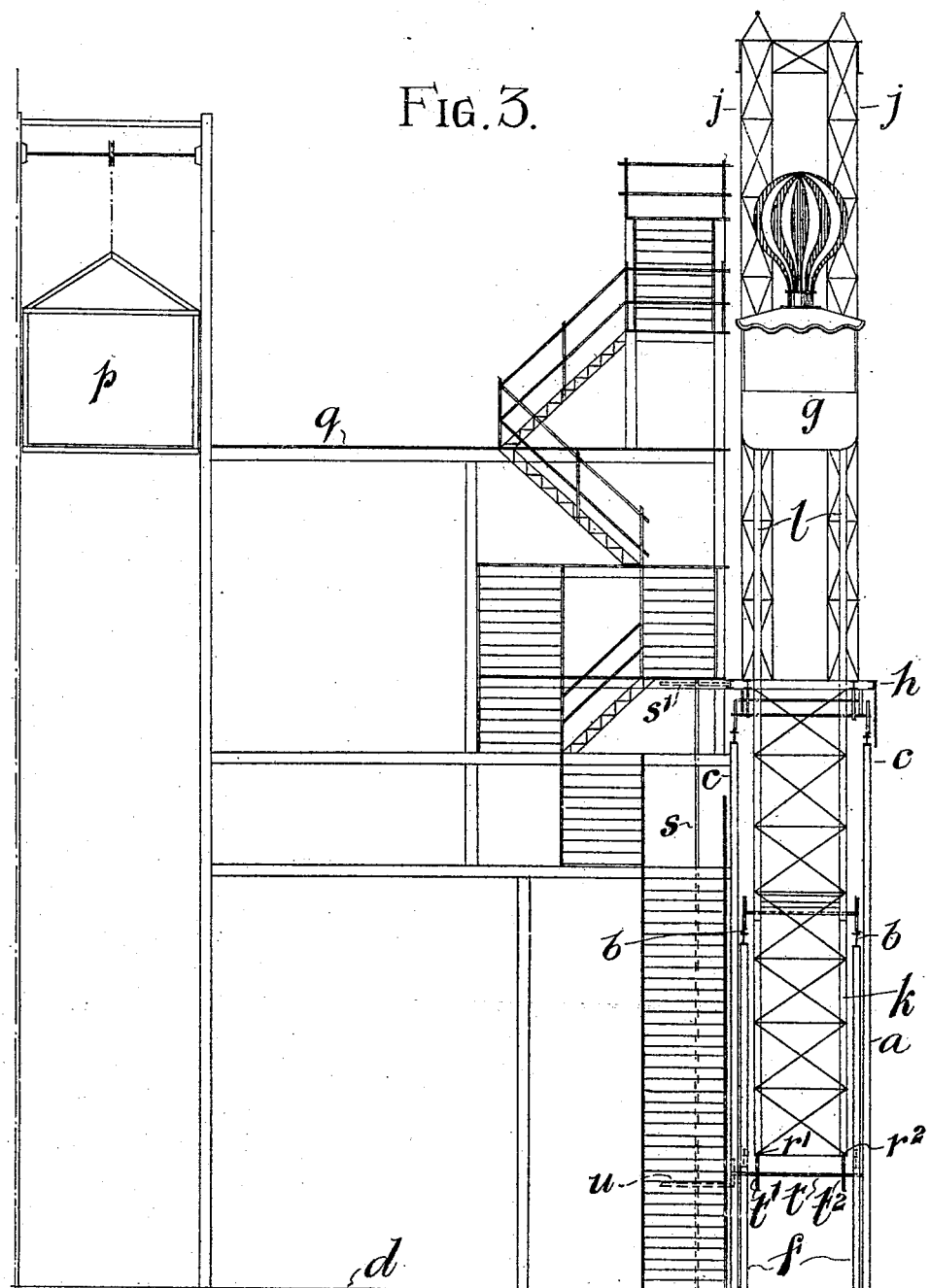
Figure 4:
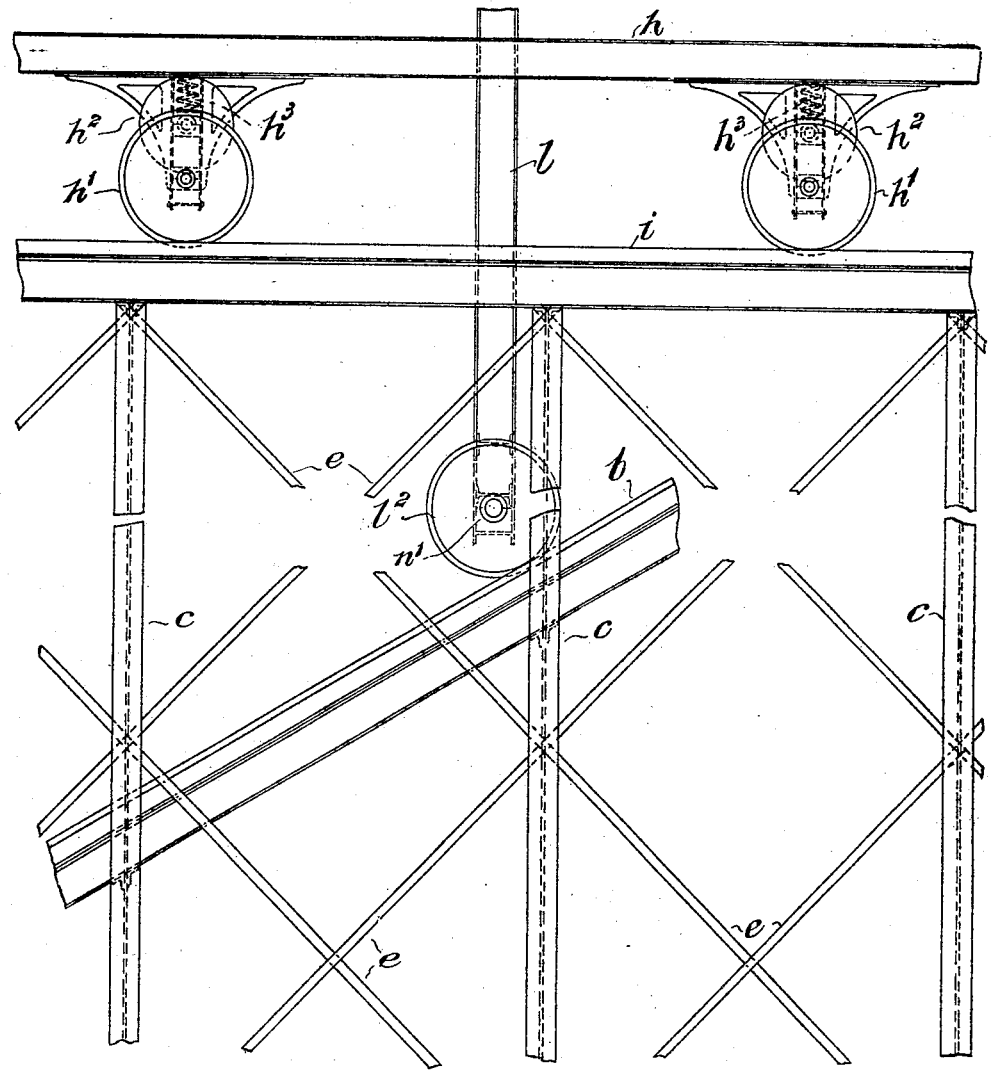
Figure 5:
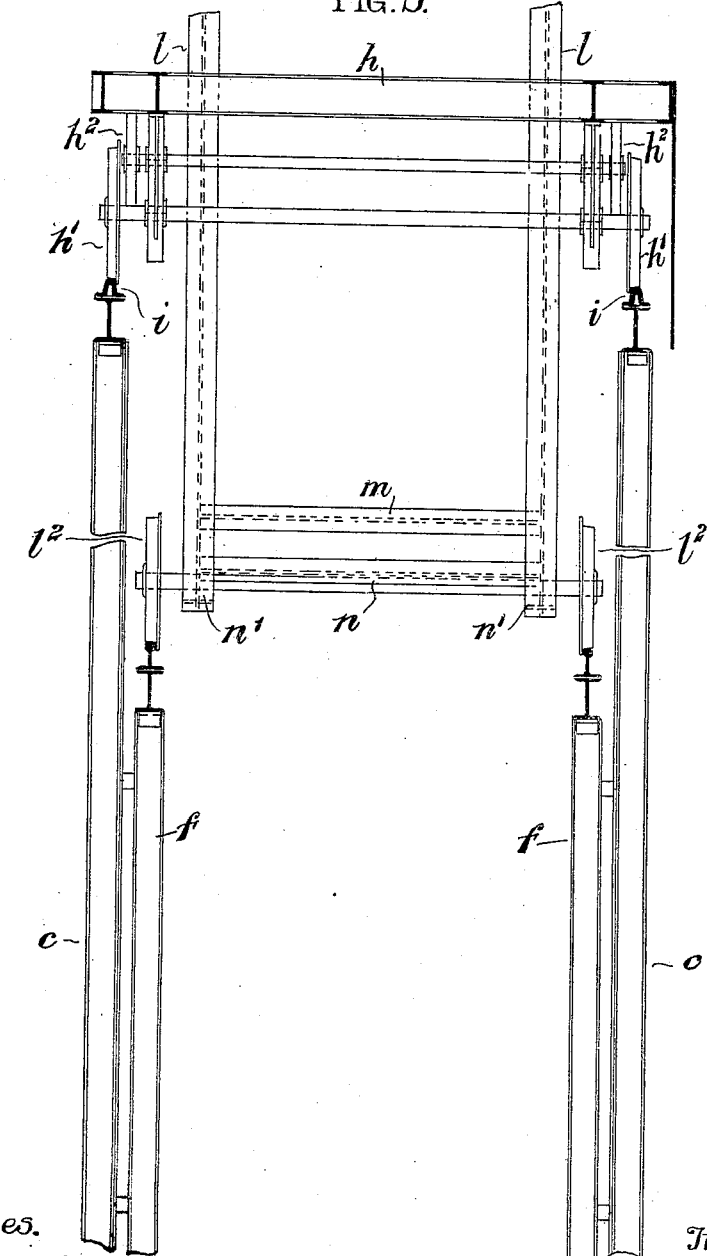

Figure 1 illustrates in elevation the general arrangement and combination of parts constituting a roundabout or merry-go-round constructed in accordance with my invention, corresponding to which Fig. 2 is a plan view, and Fig. 3 a vertical section through part of the rotating platform, showing one of the cars or vehicles in its mid-vertical position, together with means of access to same in its upper and lower positions. Figs. 4 to 8 inclusive illustrate in detail the several structural arrangements of the roundabout, and are drawn to an enlarged scale; Fig. 4 being a part elevation showing the rotating platform mounted on its track and supporting framework, corresponding to which Fig. 5 is a transverse sectional view, the bracing of the traveling framework being omitted for the sake of clearness. Fig. 6 is a part elevation showing the traveling framework with the means for guiding the car under-posts in same which run on the inclined track; corresponding to which Fig. 7 is a transverse sectional elevation, and Fig. 8 a plan view.

Like letters of reference indicate corresponding parts in all the figures.

According to my present invention as shown in the accompanying drawings a circular main frame $a$ inclosing an annular space is provided of the required height to accommodate and support within its annular space an undulating track $b$ consisting of a series of inclined planes of the desired pitch and altitude from the base to the summit of the undulation, the said main frame consisting mainly of pairs of stanchions $c$ erected from the radial beams of a ground frame $d$ and braced together into one structure by any suitable system of lattice bars $e$ or their equivalents, the space within forming a cage or housing for the track $b$ which is supported on standards $f$ or underframing adapted to take the strain of a series of loaded cars $g$ running in file over the track. Supported on the main frame inclosing the undulating track is a circular platform $h$, the wheels $h^1$ of which, being preferably furnished with antifriction wheels $h^i$ run on rails $i$ on the said frame. Stanchions $j$ are erected in pairs on the platform $h$ so pitched and arranged as to serve both as driving posts and vertical guides to the cars $g$ which are placed between, each car having its points of contact with four stanchions $j$ by means of pulleys or rollers $g^1$ and vertical stanchion tracks $j^1$. In the under frame of the revolving platform $h$ inverted stanchions $k$ are provided in pairs with their lower ends latticed together to form trunk ways for the posts $l$ and their guiding rollers $l^3$ and $l^4$ to descend within the annular space. Between the upper ends of each pair of stanchions $k$ and the underside of the traveling platform, are fixed rollers or pulleys $k^1$ and antifriction wheels $k^2$. These rollers or pulleys $k^1$ are in contact with a rail $l^1$ on the vertical under posts $l$, upon which the car is mounted, and are for the purpose of acting as guides to keep in vertical position the under posts $l$ as the circular platform is being driven round. The several parts of this traveling underframe are bound together at the bottom by a continuous bar of iron extending round the entire circle, thus making the vertical guide posts members of one rigid framework. It will now be seen that the inverted stanchions $k$, which like the upper stanchions $j$ are fixtures to the platform, share with them in carrying the cars round and in guiding their vertical movements as well. Each car is mounted on a pair of under posts $l$ by which it rides over the undulating track $b$ each under post being furnished with a wheel $l^2$ at its lower end for this purpose. One wheel is loose on the axle to allow for a difference in speed between the inner and outer tracks when both wheels run on the same axle. The under posts $l$ are guided in the vertical direction by means of two rollers $l^3$ $l^4$ which bear against vertical rails $k^3$ on the traveling framework $k$.

In order to enable the cars to run easy, I apply antifriction mechanism to this roundabout, and combine therewith springs as shown in detail in Figs. 4 and 5, in which $h^2$ are the antifriction wheels on the rotating platform, and $h^3$ are spiral or volute springs to prevent shock. Referring to Figs. 6, 7 and 8, the under posts $l$ upon which the cars are mounted, are connected together towards their lower ends by upper and lower cross frames $m$ and $n$. Between these cross frames are mounted a series of volute or spiral springs $o$, the lower ends of which are seated on the lower frame $n$, which is loose and made to slide inside the standards or upright supports $l$. This lower frame rests at each end upon a split axle box or bearing $n^1$, the axle box being supported by the axle and wheels $l^2$ running on the inclined track $b$. This combination of parts gives the car when in motion a soft and elastic movement free from jerks.

The revolving platform $h$ is driven by gearing, suitably designed for the purpose, such for instance as that shown in Fig. 2 in which $r$ represents a circular rack, which is engaged by a pinion or spur wheel $s^1$ driven from the vertical shaft $s$. In addition to driving the revolving platform from above by means of the circular rack and pinion, at the upper end of the vertical driving shaft, I fix a short horizontal shaft $t$ immediately below the underside of the rotating framework $k$ as shown in Fig. 3. This shaft is mounted in bearings fixed to the uprights or stanchions $c$ of the main frame, and adapted to engage with circular racks $r^1$ $r^2$ extending along the underside of the rotating framework. Spur wheels or pinions $t^1$ $t^2$ engage with these racks, and thus assist to draw the platform round. I propose to drive this short horizontal shaft $t$ by bevel wheels $u$ driven from the vertical driving shaft $s$. As this arrangement applies a driving motion to the traveling frame both above and below, these strains are equalized, and the general working of the moving parts facilitated.

As one car will be at one level and another at another level when the machine is at rest, lifts $p$ are provided worked by a separate engine. The passengers are taken onto a platform $q$ from these lifts, which preferably occupy the central position within the roundabout. Staircases from the platform lead into gangways or platforms at such elevations and positions as will enable the passengers to enter the cars or leave them as shown more particularly in Fig. 3, it being understood that the apparatus will stop at certain positions only with which the arrangement of staircases and platforms must correspond.

For ornamental, illuminating and advertising purposes, each car is surmounted with a dummy balloon.

Particular attention is called to the action of the guide posts $j$, extending above the rotary frame $h$, in connection with the guide posts $k$, extending below the said frame $h$. The first of these posts serve to apply the driving power to the cars from above the rotating frame, and the second of these posts apply power to the cars from below said frame, so that in no position of the cars is there any tendency to tip, or to yield to the obstructions when the wheels $l^2$ encounter the inclines. In other words, if only the upper guide posts $j$, were provided a considerable tipping moment would be created when the wheels $l^2$, on the posts $l$, came in contact with the inclines $b$, and with it a considerable unbalanced friction would be generated on the vertical bearings of the cars, thereby causing an unequal wear, and an unsteady motion. By adding the lower guide posts $k$, however, not only are these objectional features overcome, but the difference in the sensation to the passenger is at once apparent, on account of the fact that the car is maintained at all times in its strictly vertical position, and all unbalanced friction and consequent jerks are obviated.

Having thus described my invention, what I desire to claim and secure by Letters Patent of the United States, is:—

1. In a merry-go-round, the combination of a stationary frame; a traveling frame provided with a plurality of sets of guide posts extending above the same, and a plurality of sets of guide posts extending below the same; a plurality of cars adapted to be reciprocated and guided between said first mentioned posts; an undulating track mounted on said stationary frame; and under posts connected to said cars provided with wheels adapted to contact with said track, and with other wheels adapted to contact with said last mentioned posts, substantially as described.

2. In a merry-go-round, the combination of a stationary frame; a traveling frame; a plurality of sets of guide posts extending above said traveling frame; a plurality of sets of guide posts extending beneath said traveling frame; a plurality of cars adapted to reciprocate between said first mentioned posts above said traveling frame; guide rollers $k'$, on said traveling frame; supporting under posts connected to said cars adapted to contact with said rollers $k'$; guide rollers $l^3$ and $l^4$ carried by said under posts and adapted to contact with the guide posts extending beneath the said traveling frame; supporting rollers $l^2$, on the lower ends of said under posts; and an undulating track $b$, for said supporting rollers, substantially as described.

3. In a merry-go-round, the combination of a stationary frame; a traveling frame provided with antifriction rollers; a set of guide posts extending above and a set of guide posts extending below said traveling frame; a car adapted to reciprocate between said first mentioned posts; a plurality of supporting under posts on which said car is mounted; a plurality of guide rollers carried by said traveling frame with which said supporting posts contact; a plurality of other guide rollers carried by each of said supporting posts adapted to contact with said last mentioned guide posts; an inclined track; a supporting roller between the same and the lower end of each of said under posts, substantially as described.

4. In a merry-go-round, the combination of a stationary frame providing an annular space; a traveling frame above the same and provided with antifriction rollers; a set of guide posts extending above said frame, and a set of guide posts extending into said annular space below said traveling frame; a car adapted to reciprocate between said first mentioned guide posts; a plurality of supporting under posts on which said car is mounted; a plurality of guide rollers carried by said traveling frame with which said supporting posts contact; a plurality of other guide rollers contacting with the posts of said second set and carried by each of said supporting posts; an inclined track and a supporting roller between the same and the lower end of each of said under posts, substantially as described.

In testimony whereof, I affix my signature, in presence of two witnesses.

JOHN EDWARD COOPER.

Witnesses:
  R. WESTACOTT,
  ALFRED NUTTING.